(12) United States Patent
Chinchole et al.

(10) Patent No.: US 11,550,577 B2
(45) Date of Patent: Jan. 10, 2023

(54) MEMORY CIRCUIT FOR HALTING A PROGRAM COUNTER WHILE FETCHING AN INSTRUCTION SEQUENCE FROM MEMORY

(71) Applicant: Western Digital Technologies, Inc., San Jose, CA (US)

(72) Inventors: Vijay Chinchole, Bangalore (IN); Naman Rastogi, Bangalore (IN); Sonam Agarwal, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/412,968

(22) Filed: May 15, 2019

(65) Prior Publication Data

US 2020/0364050 A1    Nov. 19, 2020

(51) Int. Cl.
| | | |
|---|---|---|
| *G06F 9/32* | (2018.01) | |
| *G06F 9/30* | (2018.01) | |
| *G06F 13/16* | (2006.01) | |
| G06F 9/445 | (2018.01) | |
| G06F 16/901 | (2019.01) | |
| G06F 7/08 | (2006.01) | |

(52) U.S. Cl.
CPC ........ *G06F 9/3005* (2013.01); *G06F 9/30054* (2013.01); *G06F 9/30145* (2013.01); *G06F 9/30178* (2013.01); *G06F 9/321* (2013.01); *G06F 13/1668* (2013.01); *G06F 7/08* (2013.01); *G06F 9/44521* (2013.01); *G06F 16/9024* (2019.01)

(58) Field of Classification Search
CPC .... G06F 9/321; G06F 12/0607; G06F 9/3005; G06F 9/30145; G06F 13/1668
See application file for complete search history.

(56) References Cited

U.S. PATENT DOCUMENTS

| | | | | |
|---|---|---|---|---|
| 3,806,881 | A * | 4/1974 | Miwa ................... | G06F 12/0607 711/5 |
| 4,027,291 | A * | 5/1977 | Tokura .................... | G06F 9/267 711/157 |
| 5,146,581 | A * | 9/1992 | Kaneko ................. | G06F 9/4486 711/2 |

(Continued)

OTHER PUBLICATIONS

O. Ozturk et al., "Access Pattern-Based Code Compression for Memory-Constrained Embedded Systems," IEEE Computer Society, DATE05: Design, Automation and Test in Europe, Mar. 2005.

(Continued)

*Primary Examiner* — David J. Huisman
*Assistant Examiner* — Kasim Alli
(74) *Attorney, Agent, or Firm* — Barry IP Law, P.C.

(57) ABSTRACT

A memory circuit included in a computer system includes a memory array that stores multiple program instructions included in compressed program code. In response to receiving a fetch instruction from a processor circuit, the memory circuit may retrieve a particular instruction from the memory array. The memory circuit may, in response to a determination that the particular instruction is a particular type of instruction, retrieve additional program instructions from the memory array using an address included in the particular instruction, and send the particular program instruction and the additional program instructions to the processor circuit.

12 Claims, 14 Drawing Sheets

(56) References Cited

U.S. PATENT DOCUMENTS

| | | | |
|---|---|---|---|
| 5,603,045 | A | 2/1997 | Dockser |
| 5,678,021 | A | 10/1997 | Pawate et al. |
| 5,729,707 | A * | 3/1998 | Maki ............... G06F 9/3844 |
| | | | 712/207 |
| 5,737,750 | A | 4/1998 | Kumar et al. |
| 6,813,707 | B1 * | 11/2004 | Batcher ............ G06F 9/30054 |
| | | | 712/242 |
| 7,010,675 | B2 | 3/2006 | Karim et al. |
| 7,124,282 | B2 * | 10/2006 | Zandveld ............ G06F 9/3804 |
| | | | 712/E9.056 |
| 7,219,205 | B2 * | 5/2007 | Ware ............... G11C 7/1051 |
| | | | 711/100 |
| 7,546,438 | B2 | 6/2009 | Chung |
| 7,865,696 | B2 | 1/2011 | Klingman |
| 8,171,260 | B2 | 5/2012 | Gelman et al. |
| 8,489,861 | B2 | 7/2013 | Dowling |
| 2008/0184010 | A1 | 7/2008 | Uchiyama |
| 2017/0083333 | A1 | 3/2017 | Choudhary et al. |

OTHER PUBLICATIONS

Stan Y. Liao, et al., "Code Density Optimization for Embedded DSP Processors Using Data Compression Techniques," Revised Version for Paper in ARVLSI 1995, 14 pages.

\* cited by examiner

US 11,550,577 B2

MEMORY CIRCUIT FOR HALTING A PROGRAM COUNTER WHILE FETCHING AN INSTRUCTION SEQUENCE FROM MEMORY

BACKGROUND

Technical Field

This disclosure relates to processing in computer systems and more particularly to instruction fetching using compressed code.

Description of the Related Art

Modern computer systems may be configured to perform a variety of tasks. To accomplish such tasks, a computer system may include a variety of processing circuits, along with various other circuit blocks. For example, a particular computer system may include multiple microcontrollers, processors, or processor cores, each configured to perform respective processing tasks, along with memory circuits, mixed-signal or analog circuits, and the like.

In some computer systems, different processing circuits may be dedicated to specific tasks. For example, a particular processing circuit may be dedicated to performing graphics operations, processing audio signals, managing long-term storage devices, and the like. Such processing circuits may include customized processing circuit, or general-purpose processor circuits that execute program instructions in order to perform specific functions or operations.

In various computer systems, software or program instructions to be used by a general-purpose processor circuit may be written in a high-level programming language and then compiled into a format that is compatible with a given processor or processor core. Once compiled, the software or program instructions may be stored in a memory circuit included in the computer system, from which the general-purpose processor circuit or processor core can fetch particular instructions.

SUMMARY OF THE EMBODIMENTS

Various embodiments for memory circuit are disclosed. Broadly speaking, a memory circuit, that includes a memory array which may be configured to store a plurality of program instructions included in compressed program code, may be configured to retrieve a given program instruction of the plurality of program instructions from the memory array in response to receiving a fetch command from a processor circuit. The memory circuit may be further configured, in response to a determination that the given program instruction is a particular instruction type, retrieve a subset of the plurality of program instructions beginning at an address included in the given program instruction, and send the given program instruction and the subset of the plurality of instructions to the processor circuit. In another non-limiting embodiment, the memory circuit may be further configured to assert a halt signal in response to the determination that the given program instruction is the particular instruction type. The processor circuit may include a program counter configured to stop incrementing in response to the assertion of the halt signal.

Figure 1:
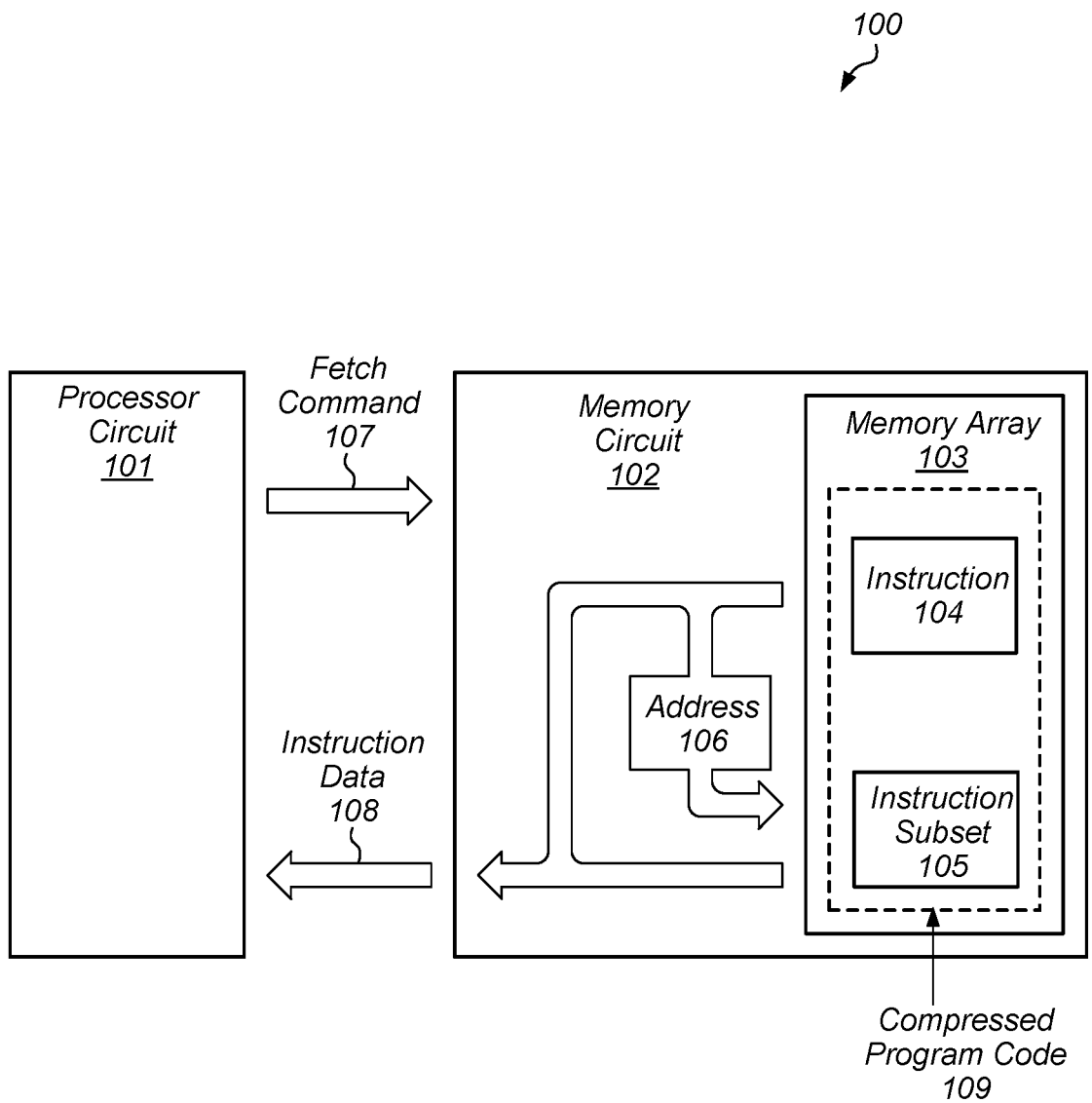
FIG. 1 is a block diagram of an embodiment of a computer system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

In computer systems that employ general-purpose processor circuits, software programs that include multiple program instructions may be used in order to allow the general-purpose processor circuits to perform a variety of functions, operations, and tasks. Such software programs may be written in a variety of high or low-level programming languages that are compiled prior to execution by the general-purpose processor circuits. The compiled version of the software program can be stored in a memory circuit from which a processor circuit may retrieve, in a processor referred to as "fetching," individual ones of the program instructions for execution.

During development of a software program, certain sequences of program instructions may be repeated through the program code of the software program. To reduce the size of the program code, such repeated sequences of program instructions may be converted to a subroutine or macro. When a particular sequence of program instructions is needed in the program code, an unconditional flow control program instruction may be inserted into the program code, which instructs the processor circuit to jump to a location in the program code corresponding to the subroutine or macro that includes the particular sequence of program code. When execution of the sequence of program code is complete, the processor circuit returns to the next program instruction following the unconditional flow control program instruction.

Unconditional flow control instructions may, for example, include call instructions. When a call instruction is executed, a processor circuit transfers the return address to a storage location (commonly referred to as a "stack") and then begins fetching, and then executing, instructions from the address location in memory specified by the call instruction. The processor circuit continues to fetch instructions along its current path until a return instruction is encountered. Once a return instruction is encountered, the processor retrieves the return address from the stack, and begins to fetch instructions starting from a location in memory specified by the return address. In other embodiments, management of the flow of program execution may be performed using other types of unconditional flow control instructions, such as unconditional branch instructions. Unlike call instructions, unconditional branch instructions may not directly modify a call/return stack, for example by pushing a return address to the stack. In some embodiments, unconditional branch instructions may be combined with other types of instructions to perform call/return stack manipulation, thereby effectively synthesizing the behavior of call and return instructions. In other embodiments, depending on the selected programming model, unconditional branch instructions may directly implement flow control by explicitly encoding destination addresses without relying on a call/return stack.

The process of altering the flow of control of program execution can influence execution performance. In particular, the process of storing the return address on the stack, fetching instructions from a subroutine, and then retrieving the return address from the stack can consume multiple clock cycles. For example, five clock cycles may be consumed in the overhead associated with calling a subroutine or macro. The time penalty associated with the overhead in calling a subroutine or macro can limit performance of a processor circuit and slow operation of a computer system. The embodiments illustrated in the drawings and described below may provide techniques for compressing (also referred to as "compacting") program code by identifying repeated sequences of program instructions across different subroutines or macros, replacing such sequences with flow control instructions, and reducing the cycle overhead associated with execution of the flow control instructions to maintain performance of a processor circuit.

A block diagram depicting an embodiment of a computer system is illustrated in FIG. 1. As illustrated, computer system 100 includes processor circuit 101 and memory circuit 102, which includes memory array 103 configured to store compacted program code 109. In various embodiments, memory circuit 102 is external to processor circuit 101. As used herein, external refers to processor circuit 101 and memory circuit 102 being included on a same integrated circuit and coupled by a communication bus, processor circuit 101 included on an integrated circuit different from one that includes memory circuit 102, or any other suitable arrangement where processor circuit 101 and memory circuit 102 are distinct circuits. As described below in more detail, compacted program code 109 may include a plurality of program instructions (or simply "instructions"), including instruction 104 and instruction subset 105. Such instructions when received and executed by processor circuit 101, result in processor circuit 101 performing a variety of operations including the management of access to one or more memory devices.

Processor circuit 101 may be a particular embodiment of a general-purpose processor configured to generate fetch command 107. As described below in more detail, processor circuit 101 may include a program counter or other suitable circuit, which increments a count value each processor cycle. The count value may then be used to generate an address included in fetch command 107. The address may, in various embodiments, correspond to a storage location in memory array 103, which stores instruction 104.

As described below, memory circuit 102 may include multiple memory cells configured to store one or more bits. Multiple bits corresponding to a particular instruction are stored in one or more memory cells, in order to store compacted program code 109 into memory array 103. As illustrated, memory circuit 102 is configured to retrieve instruction 104 of the plurality of program instructions from the memory array based, at least in part, on receiving fetch command 107. In various embodiments, memory circuit 102 may extract address information from fetch command 107, and use the extracted address information to activate particular ones of the multiple memory cells included in memory array 103 to retrieve bits corresponding to instruction 104.

In response to a determination that the instruction 104 is a particular type of instruction, memory circuit 102 is further configured to retrieve, from memory array 103, instruction subset 105 beginning at address 106, which is included in the instruction 104. The particular type of instruction may include an unconditional flow control instruction to a particular instance of a sequence of instructions included in instruction subset 105. As used herein, an unconditional flow control instruction is an instruction which changes the flow in which instructions are executed in program code by changing a location in memory from which instructions are fetched. For example, unconditional flow control instructions may include call instruction, jump instructions, unconditional branch instructions, and the like.

As described below in more detail, such unconditional flow control instructions may have been added into compacted program code 109 to replace instances of repeated sequences of instructions that were duplicated across different subroutines or macros in program code. By replacing duplicate instances of the repeated sequences with respective unconditional flow control instructions directed to a single copy of the sequence of instructions, the size of the program code may be reduced or "compacted."

Since memory circuit 102 is configured to detect when such unconditional flow control instructions have been retrieved from memory array 103 and, in turn, retrieve the sequences of instruction identified by the unconditional flow control instructions, processor circuit 101 does not have to determine the destination address for the unconditional flow control instruction and begin fetching instructions using the new address. As such, the latency associated with the use of an unconditional flow control instruction may be reduced, and the efficiency of pre-fetching instructions may be improved. It is noted that in some embodiments, memory circuit 102 may be considered to effectively expand previously compacted code in a manner that is mostly or completely transparent to processor circuit 101. That is, memory circuit 102 may decode certain instructions on behalf of (and possibly instead of) processor circuit 101, thus effectively extending the decode stage(s) of processor circuit 101's execution pipeline outside of processor circuit 101 itself, for at least some instructions. Thus, for a stream of instructions, both memory circuit 102 and processor circuit 101 operate cooperatively to fetch, decode, and execute the instructions, with at least some decoding operations occurring within memory circuit 102. In some cases, for certain instruction types (e.g., unconditional flow control instructions), memory circuit 102 and processor circuit 101 may operate cooperatively, with the memory circuit 102 decoding and executing the instructions, and processor circuit 101 managing program counter values and other bookkeeping operations.

Memory circuit 102 is also configured to send instruction subset 105 (indicated as "instruction data 108") to processor circuit 101. In some cases, memory circuit 102 may additionally send instruction 104 to processor circuit 101. As described below in more detail, memory circuit 102 may buffer (or store) individual ones of instruction subset 105 prior to sending the instructions to processor circuit 101. In some cases, instruction data 108 (which includes instruction 104 and instruction subset 105) may be sent in a synchronous fashion using a clock signal (not shown in FIG. 1) as a timing reference.

Figure 2:
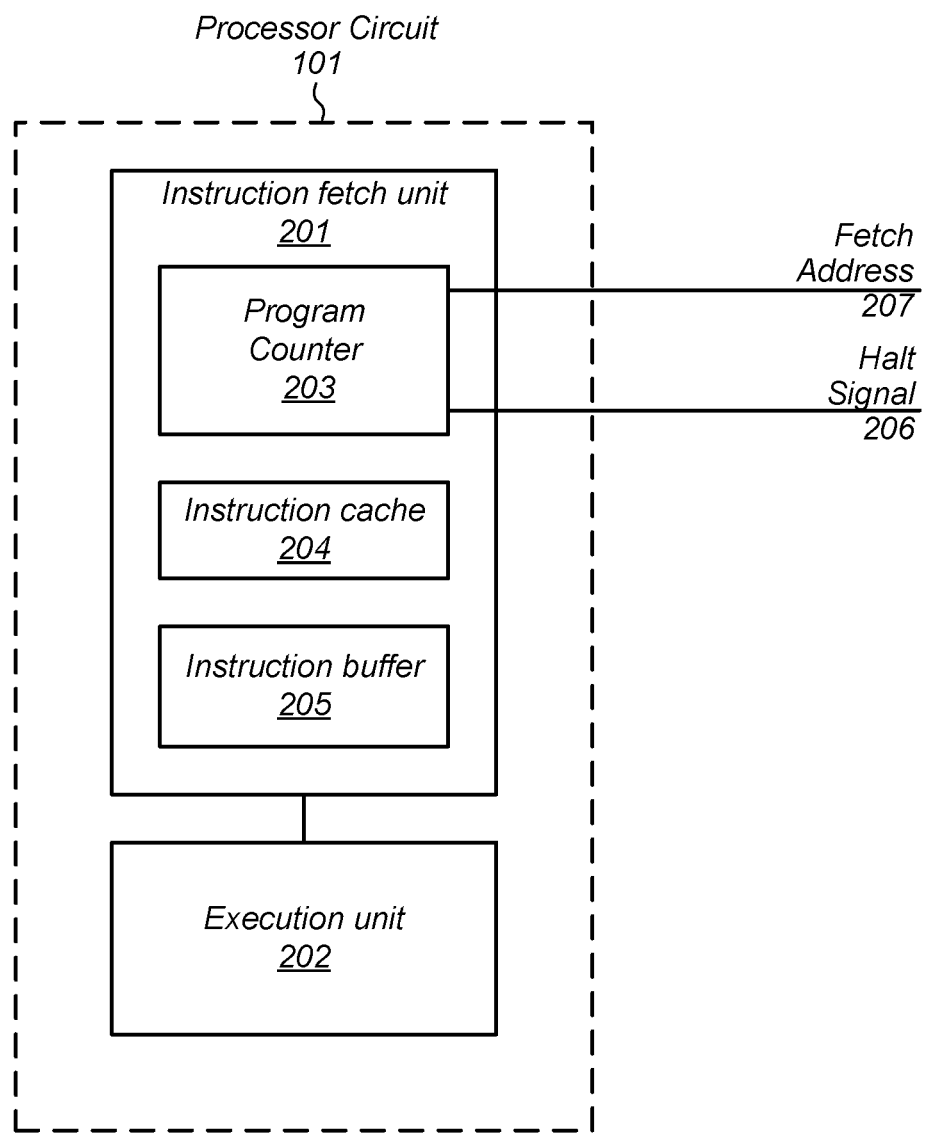
FIG. 2 illustrates a block diagram of an embodiment of a processor circuit.

Processor circuits, such as those described above in regard to FIG. 1, may be designed according to various design styles based on performance goals, desired power consumption, and the like. An embodiment of processor circuit 101 is illustrated in FIG. 2. As illustrated, processor circuit 101 includes instruction fetch unit 201 and execution unit 202. Instruction fetch unit 201 includes program counter 203, instruction cache 204, and instruction buffer 205.

Program counter 203 may be a particular embodiment of a state machine or sequential logic circuit configured to generate fetch address 207, which is used to retrieve program instructions from a memory circuit, such as memory circuit 102. To generate fetch address 207, program counter 203 may increment a count value during a given cycle of processor circuit 101. The count value may then be used to generate an updated value for fetch address 207, which can be sent to the memory circuit. It is noted that the count value may be directly used as the value for fetch address 207, or it may be used to generate a virtual version of fetch address 207. In such cases, the virtual version of fetch address 207 may be translated to a physical address before being sent to a memory circuit.

As described above, some instructions are calls to sequences of instructions compressed program code. When memory circuit 102 detects such an unconditional flow control instruction, memory circuit 102 will fetch the sequence of instructions starting from an address specified by the unconditional flow control instruction. As particular instructions included in the sequence of instructions are being fetched, they are sent to processor circuit 101 for execution.

While memory circuit 102 is fetching the sequence of instructions, the last value of fetch address 207 may be saved in program counter 203, so that when execution of the received sequence of instructions has been completed, instruction fetching may be resume at the next address following the address that pointed to the unconditional flow control instruction. To maintain the last value of fetch address 207, program counter 203 may halt incrementing during each cycle of processor circuit 101 in response to an assertion of halt signal 206. As used herein, an assertion of a signal refers to changing a value of the signal to value (e.g., a logical-1 or high logic level, although active-low assertion may also be used) such that a circuit receiving the signal will perform a particular operation or task. For example, in the present embodiment, when halt signal 206 is asserted, program counter 203 stops incrementing and a current value of fetch address 207 remains constant, until halt signal 206 is de-asserted. Other techniques for managing program counter 203 to account for the expansion of compacted code by memory circuit 102 are also possible. For example, memory circuit 102 may supply program counter 203 with a particular number of instructions that are expected, which may be used to adjust the value of program counter 203.

Instruction cache 204 is configured to store frequently used instructions. In response to generating a new value for fetch address 207, instruction fetch unit 201 may check to see if that an instruction corresponding to the new value of fetch address 207 is stored in instruction cache 204. If instruction fetch unit 201 finds the instruction corresponding to the new value of fetch address 207 in instruction cache 204, the instruction may be stored in instruction buffer 205 prior to being dispatched to execution unit 202 for execution. If, however, the instruction corresponding to the new value of fetch address 207 is not present in instruction cache 204, the new value of fetch address 207 will be sent to memory circuit 102.

In various embodiments, instruction cache 204 may be a particular embodiment of a static random-access memory (SRAM) configured to store multiple cache lines. Data stored in a cache line may include an instruction along with a portion of an address associated with the instruction. Such portions of addresses are commonly referred to as "tags." In some cases, instruction cache 204 may include comparison circuits configured to compare fetch address 207 to the tags included in the cache lines.

Instruction buffer 205 may, in some embodiments, be a particular embodiment of a SRAM configured to store multiple instructions prior to the instructions being dispatched to execution unit 202. In some cases, as new instructions are fetched by instruction fetch unit 201 and stored in instruction buffer 205, an order in which instructions are dispatched from instruction buffer 205 may be altered based on dependency between instructions stored in instruction buffer 205 and/or the availability of data upon which particular instructions stored in instruction buffer 205 are to operate.

Execution unit 202 may be configured to execute and provide results for certain types of instructions issued from instruction fetch unit 201. In one embodiment, execution unit 202 may be configured to execute certain integer-type instructions defined in the implemented instruction set architecture (ISA), such as arithmetic, logical, and shift instructions. While a single execution unit is depicted in processor circuit 101, in other embodiments, more than one execution unit may be employed. In such cases, each of the execution units may or may not be symmetric in functionality.

Figure 3:
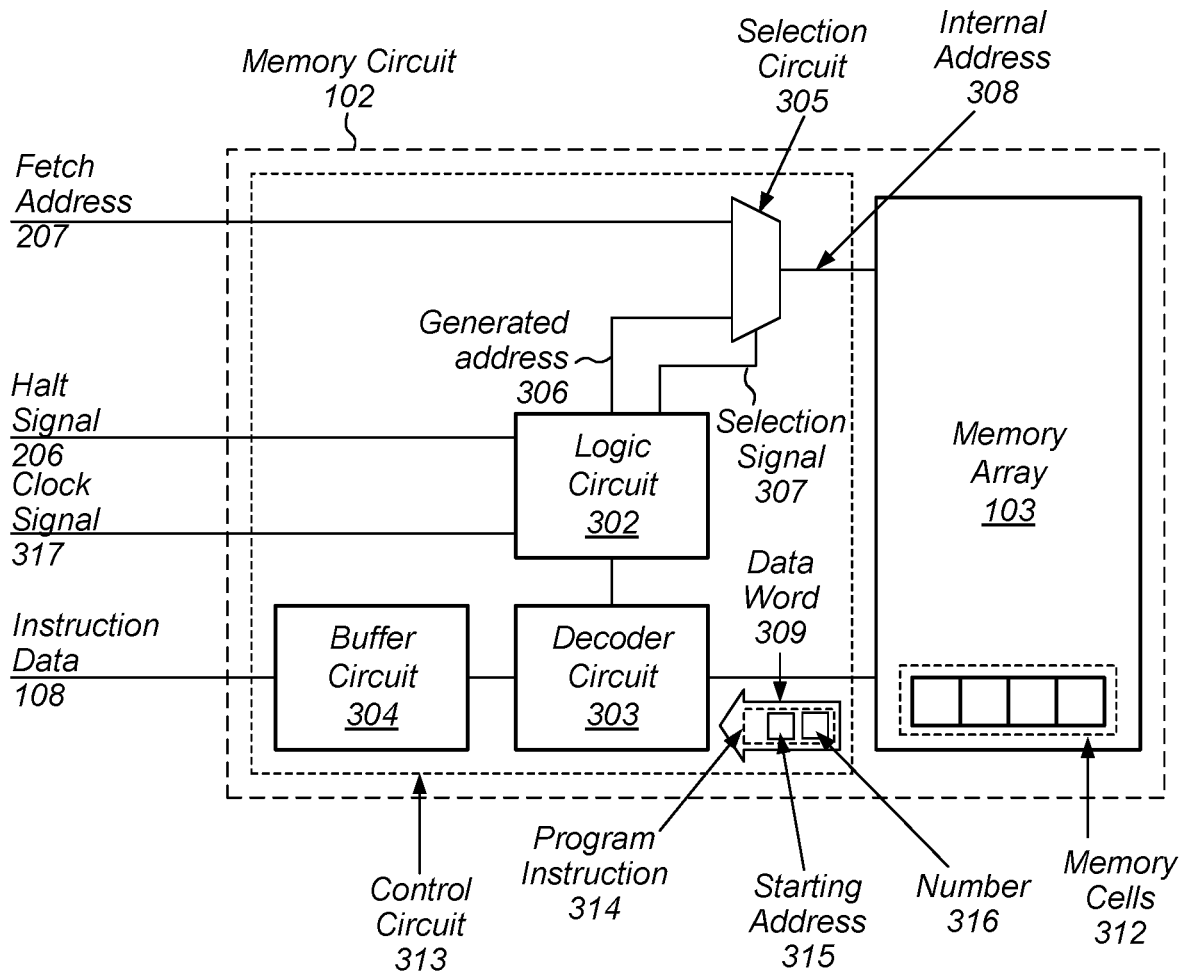
FIG. 3 illustrates a schematic diagram of an embodiment of a memory circuit.

A block diagram depicting an embodiment of memory circuit 102 is illustrated in FIG. 3. As illustrated, memory circuit 102 includes memory array 103, and control circuit 313, which includes logic circuit 302, decoder circuit 303, buffer circuit 304, and selection circuit 305.

Memory array 103 includes memory cells 312. In various embodiments, memory cells 312 may be static memory cells, dynamic memory cells, non-volatile memory cells, or any type of memory cell capable of storing one or more data bits. Multiple ones of memory cells 312 may be used to store a program instruction, such as instruction 104. Using internal address 308, various ones of memory cells 312 may be used to retrieve data word 309, which includes program instruction 314. In various embodiments, program instruction 314 includes starting address 315, which specifies a location in memory array 103 of a sequence of program instructions. Program instruction 314 also includes number 316, which specifies a number of instructions included in the sequence of program instructions.

In various embodiments, memory cells 312 may be arranged in any suitable configuration. For example, memory cells 312 may be arranged as an array that includes multiple rows and columns. As described below in more detail, memory array 103 may include multiple banks or other suitable partitions.

Decoder circuit 303 is configured to decode program instructions encoded in data words retrieved from memory array 103. For example, decoder circuit 303 is configured to decode program instruction 314 included in data word 309. In various embodiments, decoder circuit 303 may include any suitable combination of logic gates or other circuitry configured to decode at least some of the bits included in data word 309. Results from decoding data word 309 may be used by logic circuit 302 to determine a type of the program instruction 314. In addition to decoding data word 309, decoder circuit 303 also transfers data word 309 to buffer circuit 304 for storage.

Buffer circuit 304 is configured to store one or more data words that may encode respective program instructions stored in memory cells 312 included in memory array 103, and then send instruction data 108, which include fetched instructions fetched from memory array 103, to processor circuit 101. In some cases, multiple data words may be retrieved from memory array 103 during a given cycle of the processor circuit. For example, multiple data words may be retrieved from memory array 103 in response to a determination that a previously fetched instruction is a call type instruction. Since the processor circuit is designed to receive a single program instruction per cycle, when multiple data words are retrieved from memory array 103, they must be temporarily stored before being sent to the processor circuit.

In various embodiments, buffer circuit 304 may be a particular embodiment of a first-in first-out (FIFO) buffer, static random-access memory, register file, or other suitable circuit. Buffer circuit 304 may include multiple memory cells, latch circuits, flip-flop circuits, or any other circuit suitable for storing a data bit.

Logic circuit 302 may be a particular embodiment of a state machine or other sequential logic circuit. Logic circuit 302 is configured to determine whether program instruction 314 included in data word 309 is a call type instruction using results of decoding the data word 309 provided by decoder circuit 303. In response to a determination that the program instruction 314 is a call type instruction, logic circuit 302 may perform various operations to retrieve one or more program instructions from memory array 103 referenced by the program instruction 314.

To fetch the one or more program instructions from memory array 103, logic circuit 302 may extract starting address 315 from program instruction 314. In various embodiments, logic circuit 302 may generate address 306 using starting address 315. In some cases, logic circuit 302 may generate multiple sequential values for generated address 306. The number of sequential values may be determined using number 316 included in program instruction 314. Additionally, logic circuit 302 may be configured to change a value of selection signal 307 so that selection circuit 305 generates internal address 308 by selecting generated address 306 instead of fetch address 207.

Additionally, logic circuit 302 may be configured to assert halt signal 206 in response to the determination that program instruction 314 is a call type instruction. As described above, when halt signal 206 is asserted, program counter 203 may stop incrementing until halt signal 206 is de-asserted. Logic circuit 302 may keep halt signal 206 asserted until the number of program instructions specified by number 316 included program instruction 314 have been retrieved from memory array 103 and stored in buffer circuit 304.

Selection circuit 305 is configured to generate internal address 308 by selecting either fetch address 207 or generated address 306. In various embodiments, the selection is based on a value of selection signal 307. It is noted that fetch address 207 may be received from a processor circuit (e.g., processor circuit 101) and may be generated by a program counter (e.g., program counter 203) or other suitable circuit. Selection circuit 305 may, in various embodiments, include any suitable combination of logic gates, wired-OR logic circuits, or any other circuit capable of selecting between fetch address 207 and generated address 306.

Figure 4:
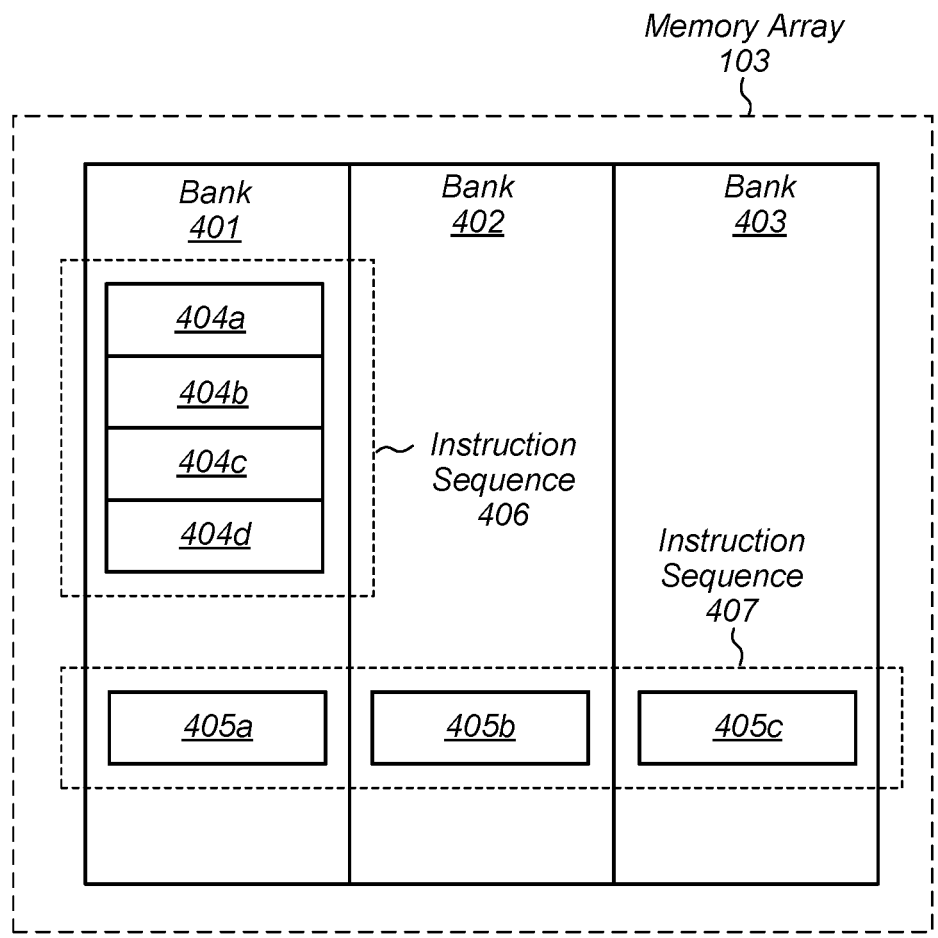
FIG. 4 is a block diagram of an embodiment of a multi-bank memory array.

Memory arrays, such as memory array 103, may be constructed using various architectures. In some cases, multiple banks may be employed for the purposes of power management and to reduce load on some signals internal to the memory array. A block diagram depicting an embodiment of a multi-bank memory array is illustrated in FIG. 4. As illustrated, memory array 103 includes banks 401-403.

Each of banks 401-403 may include multiple memory cells configured to store instructions included in compacted program code, such as compacted program code 109. In various embodiments, a number of memory cells activated in parallel within a given one of banks 401-403 may correspond to a number of data bits included in a particular instruction included in the compacted program code.

In some cases, compacted program code may be stored in a sequential fashion starting with an initial address mapped to a particular location within a given one of memory banks 401-403. In other cases, however, pre-fetching of instructions included within a sequence of instructions referenced by an unconditional flow control instruction may be improved by storing different instructions of a given sequence of instructions across different ones of banks 401-403.

As illustrated, instruction sequences 406 and 407 are stored in memory array 103. In various embodiments, respective unconditional flow control instructions (not shown), that references instruction sequences 406 and 407, may be stored elsewhere within memory array 103. Instruction sequence 406 includes instructions 404a-404d, and instruction sequence 407 includes 405a-405c. Each of instructions 404a-404d are stored in memory cells included in bank 401, while each of instructions 405a-405c are stored in respective groups of memory cells in banks 401-403.

During retrieval of instruction sequence 406 in response to detection of an unconditional flow control instruction that references instruction sequence 406, bank 401 must be repeatedly activated to sequentially retrieve each of instructions 404a-404d. While this may still be an improvement in a time to pre-fetch instruction sequence 406 versus using a conventional program counter-based method, multiple cycles of the memory circuit 102 are still employed since only single rows within a given bank may be activated during a particular cycle of memory circuit 102.

In contrast, when an unconditional flow control instruction that references instruction sequence 407 is detected, each of instructions 405a-405c may be retrieved in parallel. Since banks 401-403 are configured to operate independently, more than one of banks 401-403 may be activated in parallel, allowing multiple data words, that correspond to respective instructions, to be retrieved from memory array 103 in parallel, thereby reducing the time to pre-fetch instructions 405a-405c. It is noted that activating multiple banks in parallel may result in memory circuit 102 dissipating additional power.

Structures such as those shown with reference to FIGS. 2-4 for accessing compacted program code may be referred to using functional language. In some embodiments, these structures may be described as including "a means for generating a fetch command," "a means for storing a plurality of program instructions included in compacted program code," "a means for retrieving a given program instruction of the plurality of program instructions," "a means for determining a type of the given program instruction," "a means for retrieving, in response to determining the given program instruction is a particular type of instruction, a subset of the plurality of program instructions beginning at an address included in the given program instruction," and "a means for sending the subset of the plurality of program instructions to the processor circuit."

The corresponding structure for "means for generating a fetch command" is program counter 203 as well as equivalents of this circuit. The corresponding structure for "means for storing a plurality of program instructions included in compacted program code" is banks 402-403 and their equivalents. Additionally, the corresponding structure for "means for retrieving a given program instruction of the plurality of program instruction" is logic circuit 302 and selection circuit 305, and their equivalents. The corresponding structure for "means for determining a type of the given program instruction" is decoder circuit 303 as well as equivalents of this circuit. The corresponding structure for "means for retrieving, in response to determining the given program instruction is a particular type of instruction, a subset of the plurality of program instructions beginning at an address included in the given program instruction" is logic circuit 302 and selection circuit 305, and their equivalents. Buffer circuit 304, and its equivalents are the corresponding structure for "means for sending the subset of the plurality of instructions to the processor circuit."

Figure 5:
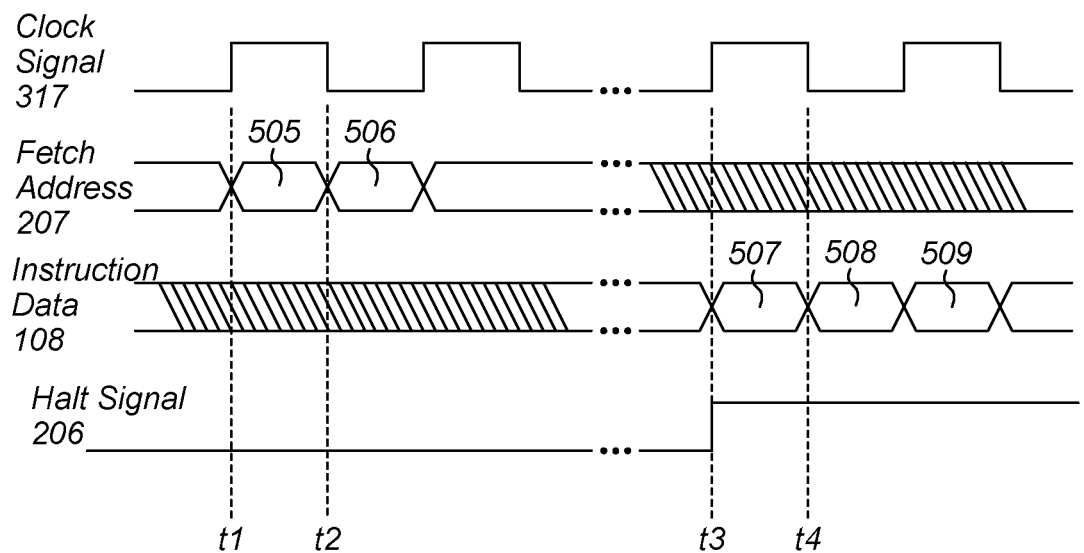
FIG. 5 depicts example waveforms associated with fetching instructions.

Turning to FIG. 5, example waveforms associated with fetching instructions are depicted. As illustrated, at time t1, clock signal 317 is asserted and fetch address 207 takes on value 505, while instruction data 108 is a logical "don't care" (i.e., its value can be either a logical-0 or a logical-1), and halt signal 206 is a logical-0. At time t2, value 505 of fetch address 207 is latched by memory circuit 102 and used to access memory array 103. Additionally, fetch address 207 transitions to value 506.

At time t3, clock signal 317 again transitions to a logical-1, and value 507 is output on instruction data 108 by memory circuit 102. In various embodiments, value 507 corresponds to an instruction specified by value 505 on fetch address 207, and the instruction is an unconditional flow control instruction. It is noted that the difference in time between time t2 and t3 may correspond to a latency of memory circuit 102 to retrieve a particular instruction from memory array 103.

In response to determining that the instruction specified by value 505 is an unconditional flow control instruction, memory circuit 102 asserts halt signal 206 at time t3. As described above, when halt signal 206 is asserted, program counter 203 is halted, and memory circuit 102 begins retrieving an instruction sequence specified by an address included in the instruction specified by value 505. At time t4, the first of the sequence of instructions, denoted by value 508, is output by memory circuit 102 onto instruction data 108. On the following falling edge of clock signal 317, the next instruction of the sequence of instructions (denoted by value 509) is output by memory circuit 102. Memory circuit 102 continues to output instructions included in the instruction sequence on both rising and falling edges of clock signal 317 until all of the instructions included in the sequence have been sent to processor circuit 101.

It is noted that waveforms depicted in FIG. 5 are merely examples. In other embodiments, fetch address 207 may transition only on rising edges of clock signal 317, and different relative timings between the various signals are possible.

Figure 6:
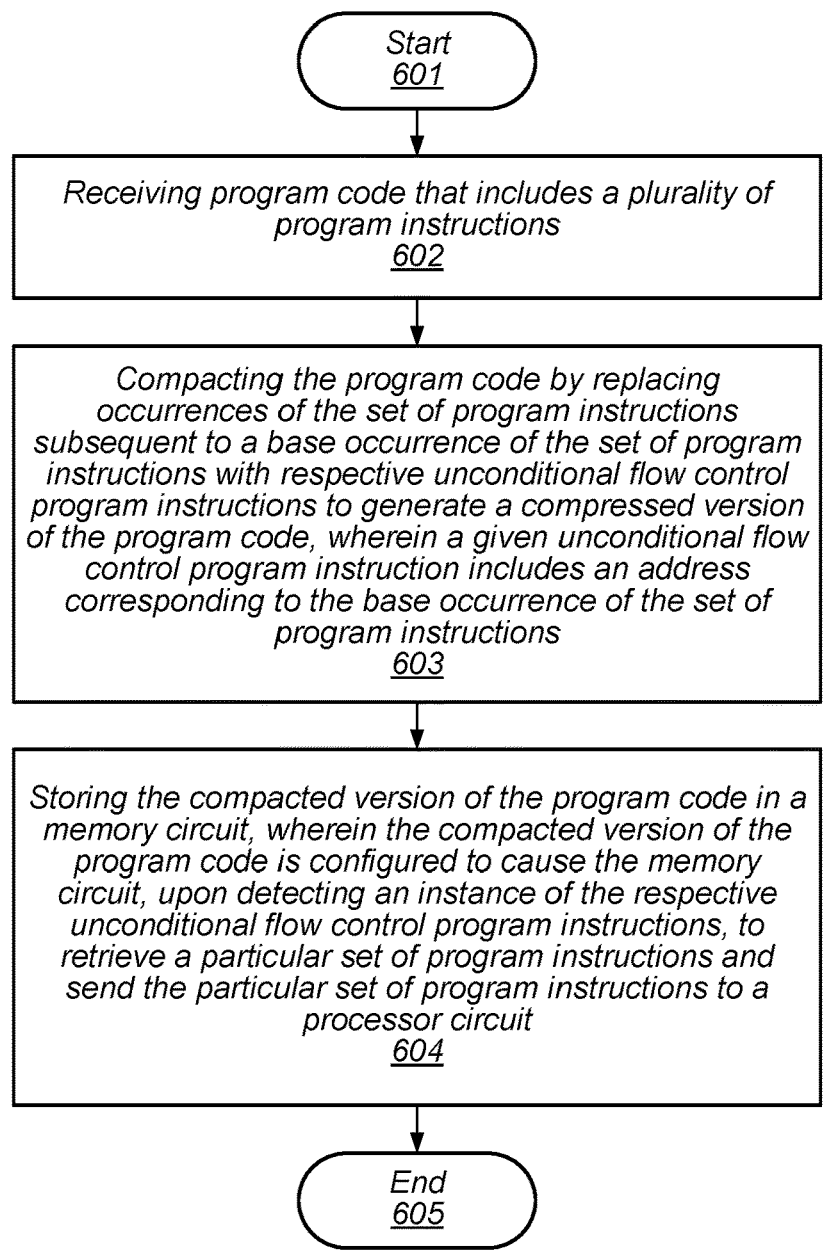
FIG. 6 illustrates a flow diagram depicting an embodiment of a method for operating a computer system.

Turning to FIG. 6, a flow diagram depicting an embodiment of a method for fetching and decompressing program code is illustrated. The method, which may be applied to various computer systems, e.g., computer system 100 as depicted in FIG. 1, begins in block 601.

The method includes receiving program code that includes a plurality of program instructions (block 602). The received program code may be written in a low-level programming language (commonly referred to as "assembly language") that highly correlates with instructions available in an ISA associated with the processor on which the code will be executed. Code written in an assembly language is often referred to as "assembly code." In other cases, the received program code may be written in one of a variety of programming languages, e.g., C++, Java, and the like, and may include references to one or more software libraries which may be linked to the program code during compilation. In such cases, the program code may be translated into assembly language.

The method further includes compacting the program code by replacing occurrences of the set of program instructions subsequent to a base occurrence of the set of program instructions with respective unconditional flow control program instructions to generate a compacted version of the program code, wherein a given unconditional flow control program instruction includes an address corresponding to the base occurrence of the set of program instructions (block 603). In some cases, a processing script may be used to analyze the program code to identify multiple occurrences of overlapping code across different subroutines or macros as candidates for replacement with unconditional flow control program instructions. As described below in more detail, the method may include translating the program code into a different representation, e.g., a directed graph (or simply a "graph") so that the relationships between the various individual program instructions across the different subroutines or macros can be identified.

The method also includes storing the compacted version of the program code in a memory circuit (block 604). In various embodiments, the compacted version of the program code is configured to cause the memory circuit, upon detecting an instance of the respective unconditional flow control program instructions, to retrieve a particular set of program instructions and send the particular set of program instructions to a processor circuit.

In some cases, the compacted version of the program code may be compiled prior to storing the in the memory circuit. As used herein, compiling program code refers to translating the program code from a programming language to collection of data bits, which correspond to instructions included in an ISA for a particular processor circuit. As described above, different portions of the program code may be stored in different blocks or partitions within the memory circuit to facilitate retrieval of instruction sequences associated with unconditional flow control instructions. The method concludes in block 605.

Figure 7:
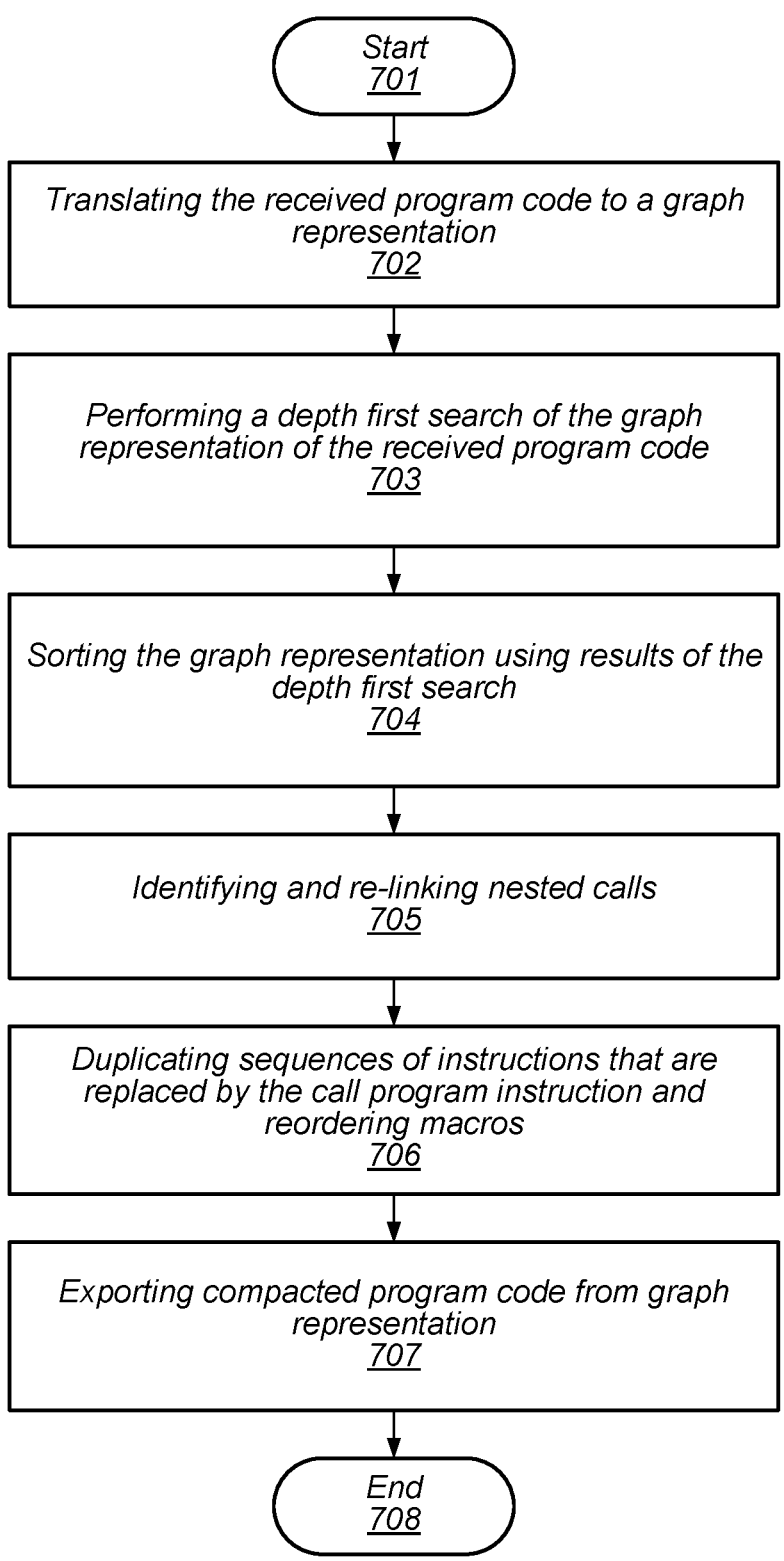
FIG. 7 illustrates a flow diagram depicting an embodiment of a method for generating compressed program code.

Turning to FIG. 7, a flow diagram depicting an embodiment of a method for compressing program code is illustrated. The method, which may correspond to block 603 of the flow diagram of FIG. 6, begins in block 701.

The method includes translating the received program code to a graph representation (block 702). As part of translating the received program code to the graph representation, some embodiments of the method include arranging subroutines or macros included in the received program code on the basis of the number of instructions included in each subroutine or macro. Once the subroutines or macros have been arranged, the method may continue with assigning, by the processing script, a name of each subroutine or macro to a respective node within the graph representation. In some embodiments, the method further includes assigning, for a given subroutine or macro, individual program instructions included in the given subroutine or macro to child nodes of the particular node to which the given subroutine name is assigned. The process may be repeated for all subroutines or macros included in the received program code.

The method also includes performing a depth first search of the graph representation of the received program code using the graph representation (block 703). In various embodiments, the method may include starting the search from a node in the graph representation corresponding to a particular subroutine or macro that has a smallest number of child nodes. Using the node as the smallest number of child nodes as a starting point, the individual program instructions included in particular subroutine or macro are compared to the program instructions included in other subroutines or macros included in the received assembly code. Program instructions that are common (or "overlapping") between one subroutine or macro and another subroutine or macro are identified.

Figure 9:
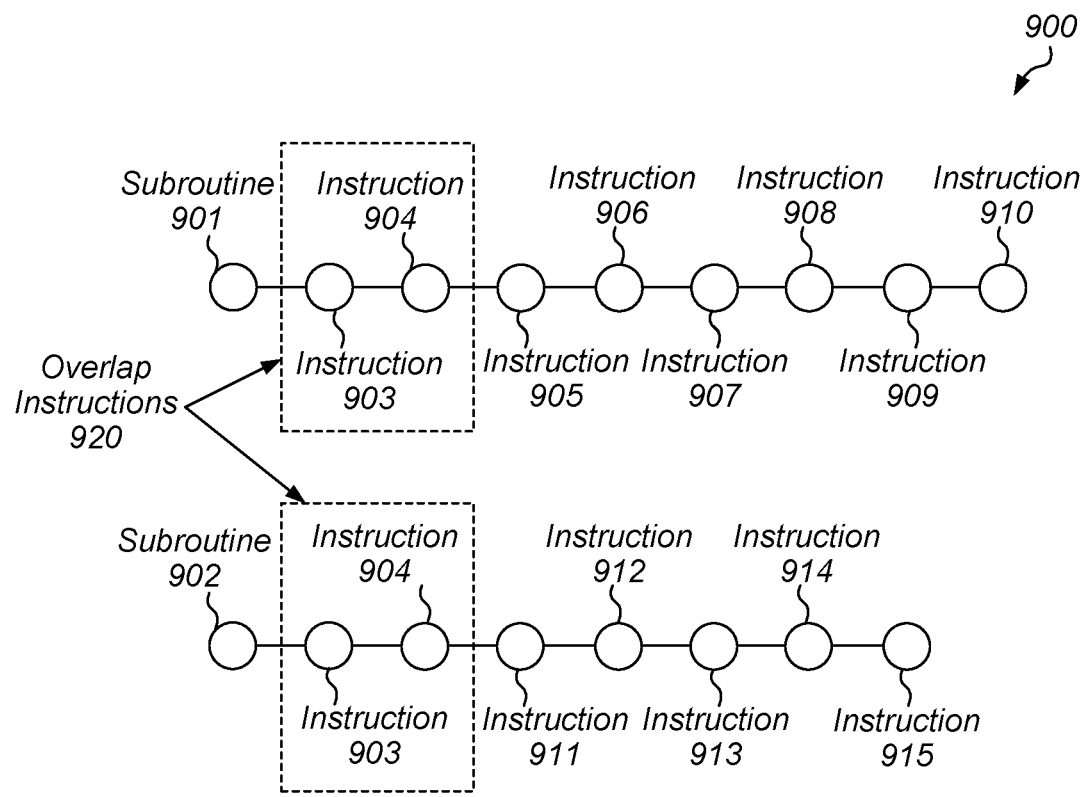
FIG. 9 is a block diagram depicting overlapping code within a graph representation of program code.

An example of a graph representation of program code that includes overlapping instructions is depicted in FIG. 9. As illustrated, program code 900 includes subroutines 901 and 902. Subroutine 901 includes program instructions 903-910, and subroutine 902 also includes instances of program instructions 903 and 904, as well as program instructions 911-915. Since instances of program instructions 903 and 904 are included in both subroutine 901 and 902, both instances of program instructions 903 and 904 are identified as overlap instructions 920. Although only a single case of overlapping program instructions is depicted in the embodiment illustrated in FIG. 9, in other embodiments, multiple sequences of program instructions may overlap between two or more subroutines or macros.

The method further includes sorting the graph representation of the received program code using results of the depth first search (block 704). To improve the efficiency of the compaction of the received program code, certain sequences of program instructions within a given subroutine or macro may be reordered so that the reordered sequence of program instructions is the same as a sequence of program instructions in another subroutine or macro, thereby increasing an amount of overlapped code between the two subroutines or macros. It is noted that care must be taken in rearranging the order of the program instructions so as to not affect the functionality of a given subroutine or macro. In various embodiments, a bubble sort or other suitable sorting algorithm may be used to sort program instructions within a subroutine or macro on the basis of the number of times each program instruction is used with the subroutine or macro without affecting the functionality of the subroutine or macro.

The method also includes identifying and re-linking nested calls (block 705). In some cases, a given subroutine or macro may include a sequence of program instructions which overlap with multiple other subroutines or macros. The graph representation may indicate that the overlapping between the various subroutines or macros as being nested. As used herein, a nested overlap refers to a situation where a first subroutine or macro has a sequence of program instructions that overlap with a second subroutine or macro, which, in turn, overlaps with a third subroutine or macro.

Figure 10A:
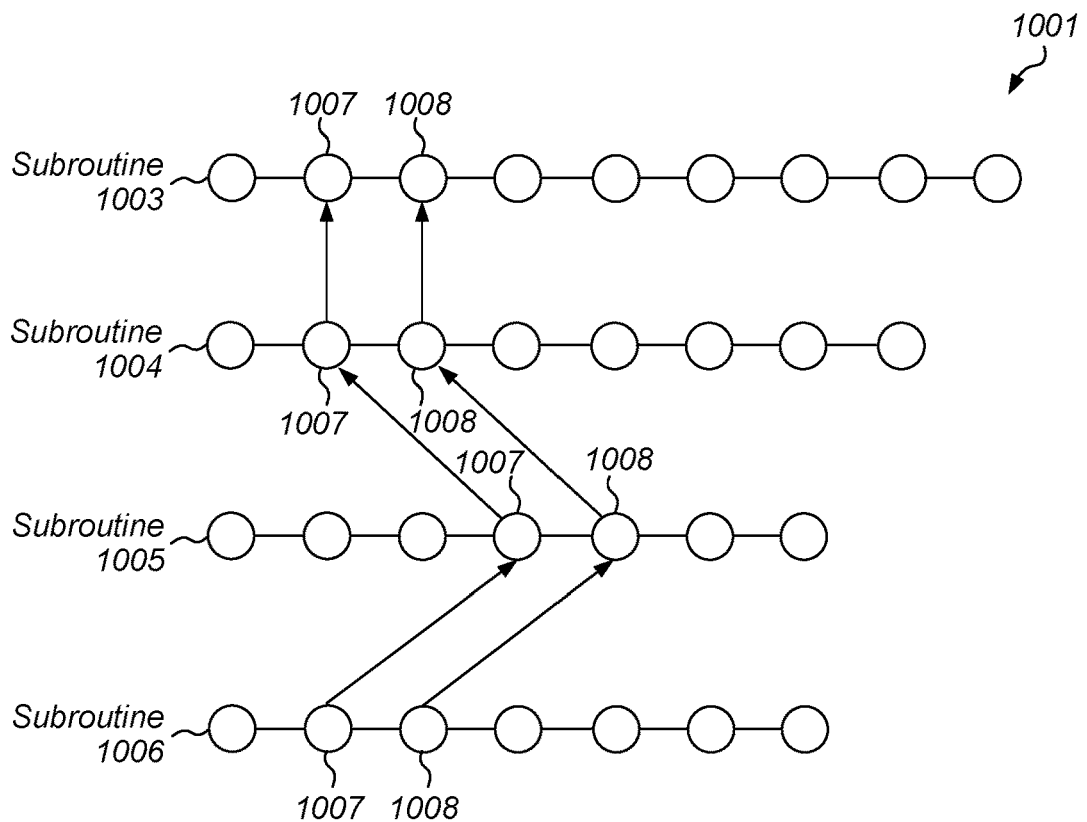
FIG. 10A is a block diagram depicting nested links within a graph representation of program code.

An example of nested links is illustrated in FIG. 10A. As illustrated in program code 1001, program instructions 1007 and 1008 are included in each of subroutines 1003-1006. As sorted and identified by the previous operations, the instances of program instructions 1007 and 1008 in subroutine 1006 are linked to the instances of program instructions 1007 and 1008 included in subroutine 1005. In a similar fashion, the instances of program instructions 1007 and 1008 included in subroutine 1005 are linked to the instances of program instructions in 1007 and 1008 included in subroutine 1004, which are, in turn, linked to the instances of program instructions 1007 and 1008 in subroutine 1004.

Figure 10B:
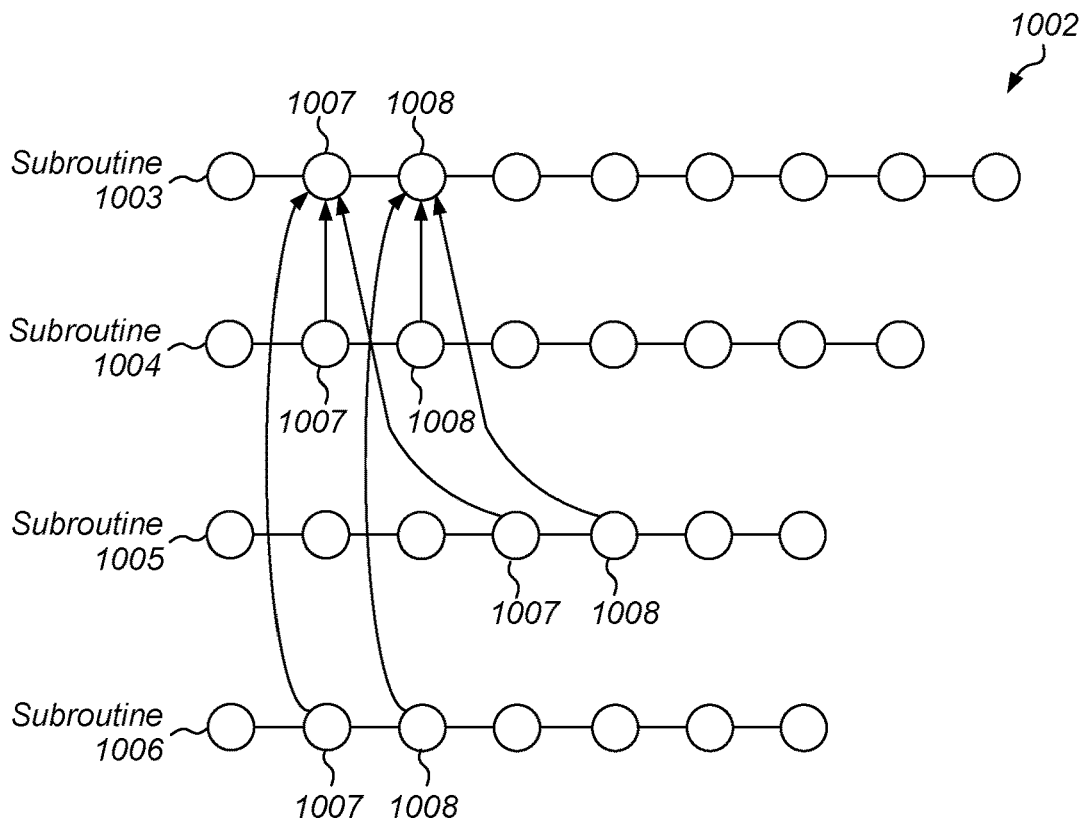
FIG. 10B is a block diagram depicting direct links within a graph representation of program code.

To further improve the efficiency of the compaction, nested overlaps are re-linked within the graph such that all subsequent occurrences of a particular sequence of program instructions directly link to the initial occurrence of the particular sequence of program instructions. An example of re-linking sequences of program instructions is depicted in FIG. 10B. As illustrated in program code 1002, the instances of program instructions 1007 and 1008 in each of subroutines 1004, 1005, and 1006 are now linked directly to the initial instances of program instructions 1007 and 1008 included in subroutine 1003.

The method further includes duplicating sequences of program instructions replaced by respective unconditional flow control program instructions (block 706). In various embodiments, a particular unconditional flow control program instruction will include an address corresponding to the location of the initial occurrence of the sequence of program instructions that the particular program instruction is replacing. Additionally, the particular unconditional flow control program instruction may include a number of instructions that are included in the sequence of program instructions the particular program instruction is replacing.

Figure 11A:
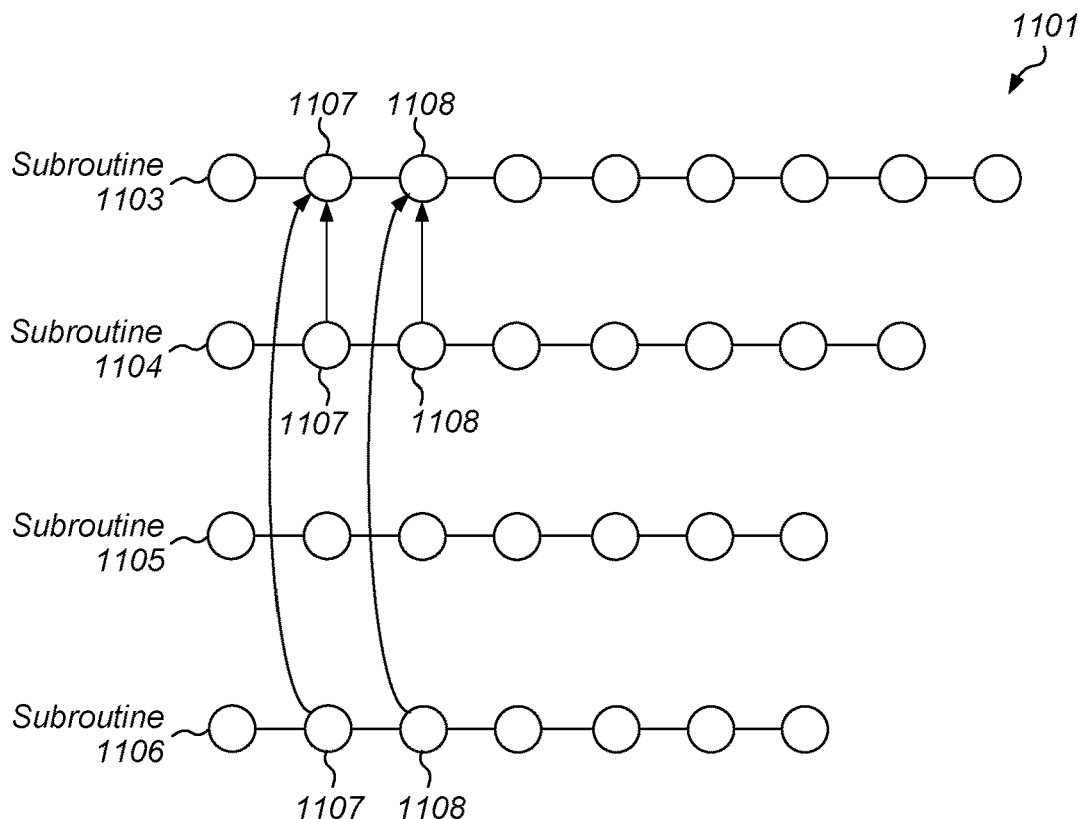
FIG. 11A is a block diagram depicting long calls within a graph representation of program code.

In some cases, the method may include re-ordering the subroutines or macros within the compressed program code. When an unconditional flow control program instruction is inserted to replace a duplicate sequence of program instructions, a change in address value from the unconditional flow control instruction will result. The larger the change in address value, the larger the number of data bits necessary to encode the new address value. An example of an initial order of program instructions is depicted in FIG. 11A. As illustrated in program code 1101, both subroutines 1104 and 1106 include instances of program instructions 1107 and 1108, which are mapped to initial instances of program instructions 1107 and 1108 included in subroutine 1103. An unconditional flow control instruction inserted to replace the instances of program instructions 1107 and 1108 in subroutine 1106 will result in a larger change in address value than the insertion of an unconditional flow control instruction to replace the instances of program instructions 1107 and 1108 included in subroutine 1104.

Figure 11B:
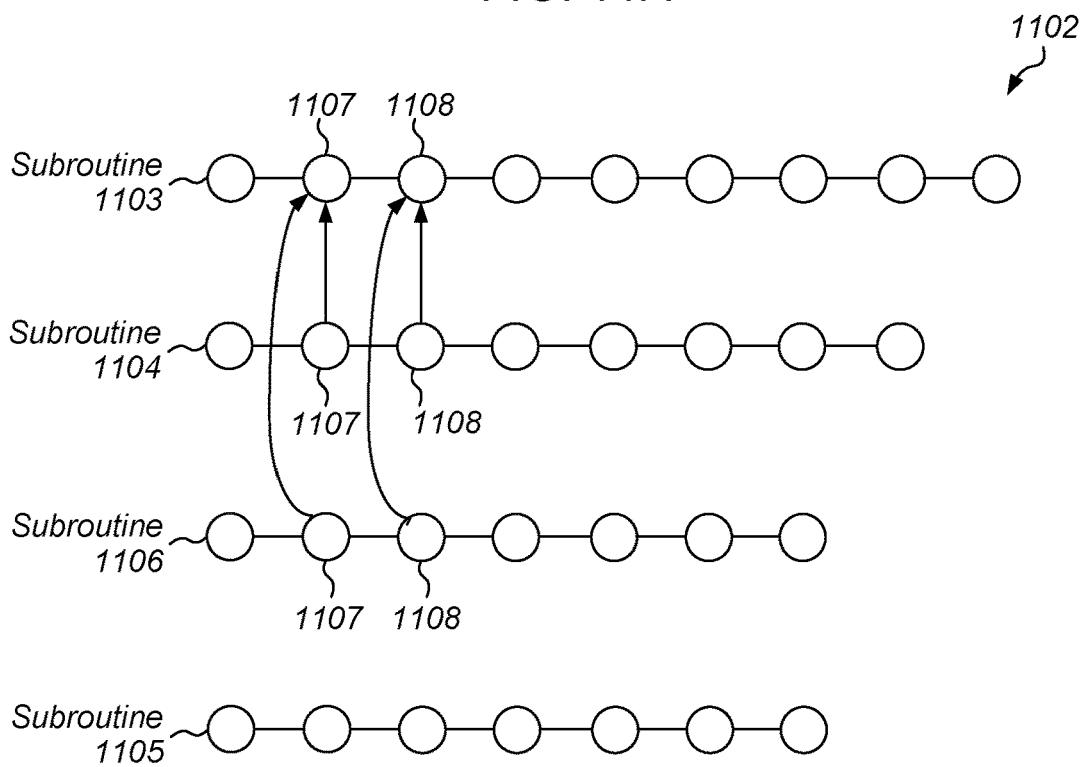
FIG. 11B is a block diagram depicting re-ordered subroutines with a graph representation of program code.

To minimize this change in address value, the subroutines or macros within the compressed program code may be reordered so that subroutines or macros with a large amount of overlapping program instructions may be located near each other in the address space of the compressed program code. An example of reordered subroutines is depicted in FIG. 11B. As illustrated, the positions of subroutine 1105 and subroutine 1006 within program code 1102 have been interchanged. By changing the order of subroutines 1105 and 1106, the change in address value resulting from the insertion of an unconditional flow control instruction to replace in the instances of program instructions 1107 and 1108 in subroutine 1106 will be reduced.

The method also includes exporting compacted program code from the graph representation (block 707). In various embodiments, the processor script may generate a file that includes the compacted program code by incorporating all of the changes made to the initial program code using the graph representation. The compacted code may be stored directly in a memory circuit for use by a processor circuit or may be further processed or compiled before being stored in the memory circuit. The method concludes in block 708.

Figure 8:
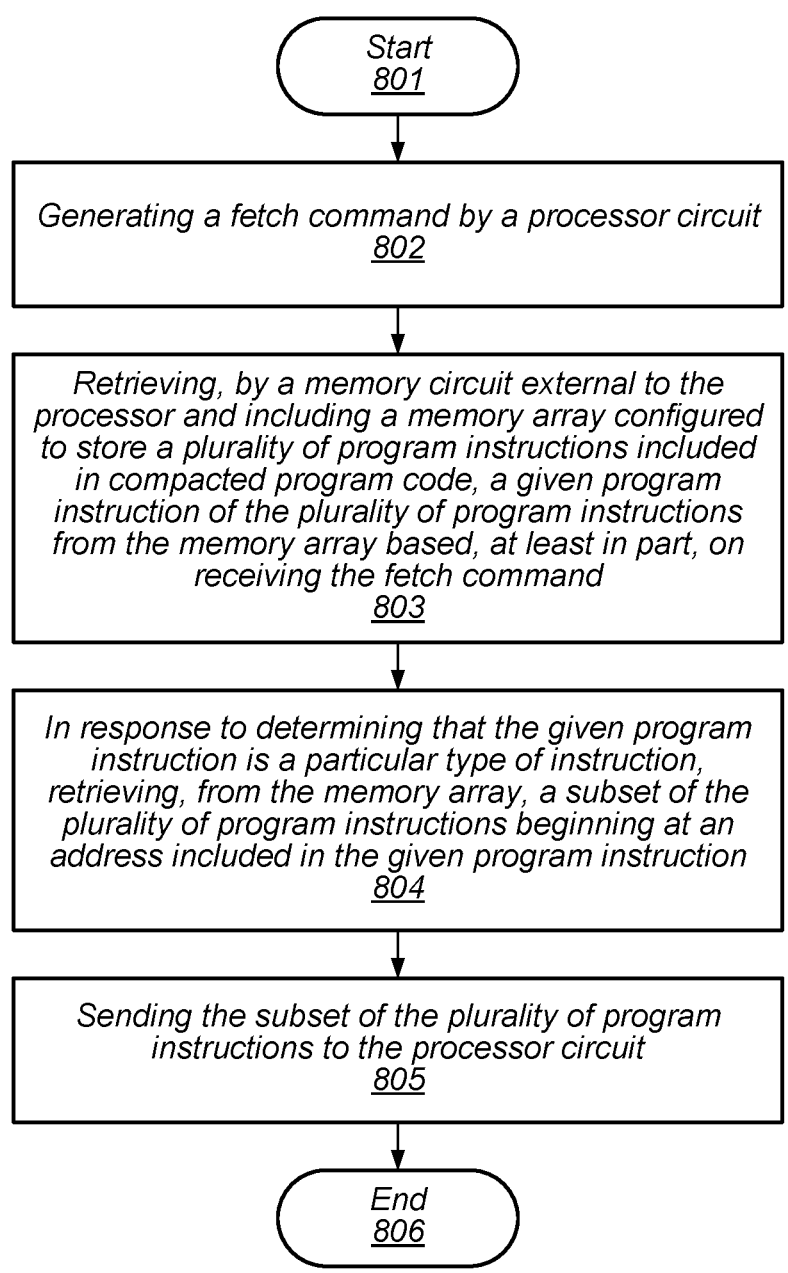
FIG. 8 illustrates a flow diagram depicting an embodiment of a method for operating a computer system using compacted program code.

Turning to FIG. 8, a flow diagram depicting an embodiment of a method for operating a processor circuit and a memory circuit in a computer system is illustrated. The method, which may be applied to various embodiments of computer system including the embodiment depicted in FIG. 1, begins in block 801.

The method includes generating a fetch command by a processor circuit (block 802). In various embodiments, the method may include incrementing a program counter count value and generating an address using the program counter count value, and including the address in the fetch command.

The method further includes retrieving, by a memory circuit external to the processor and including a memory array configured to store a plurality of program instructions included in compacted program code, a given program instruction of the plurality of instructions from the memory array based, at least in part, on receiving the fetch command (block 803). In some embodiments, the method may include extracting address information from the fetch command, and activating particular ones of multiple memory cells included in the memory array using the extracted address information.

In response to determining that the given program instruction is a particular type of instruction, the method also includes retrieving, from the memory array, a subset of the plurality of program instructions beginning at an address included in the given program instruction (block 804). It is noted that, in various embodiments, the type of instruction may include an unconditional flow control instruction, which may change the flow of the program code to a particular instance of a sequence of instructions included in the subset of the plurality of program instructions.

The method also includes sending the subset of the plurality of program instructions to the processor circuit (block 805). In various embodiments, the method may include buffering (or storing) individual ones of the subset of program instructions. The method may also include sending the subset of the plurality of program instructions to the processor circuit in a synchronous fashion using a clock signal as a timing reference. The method concludes in block 806.

Figure 12:
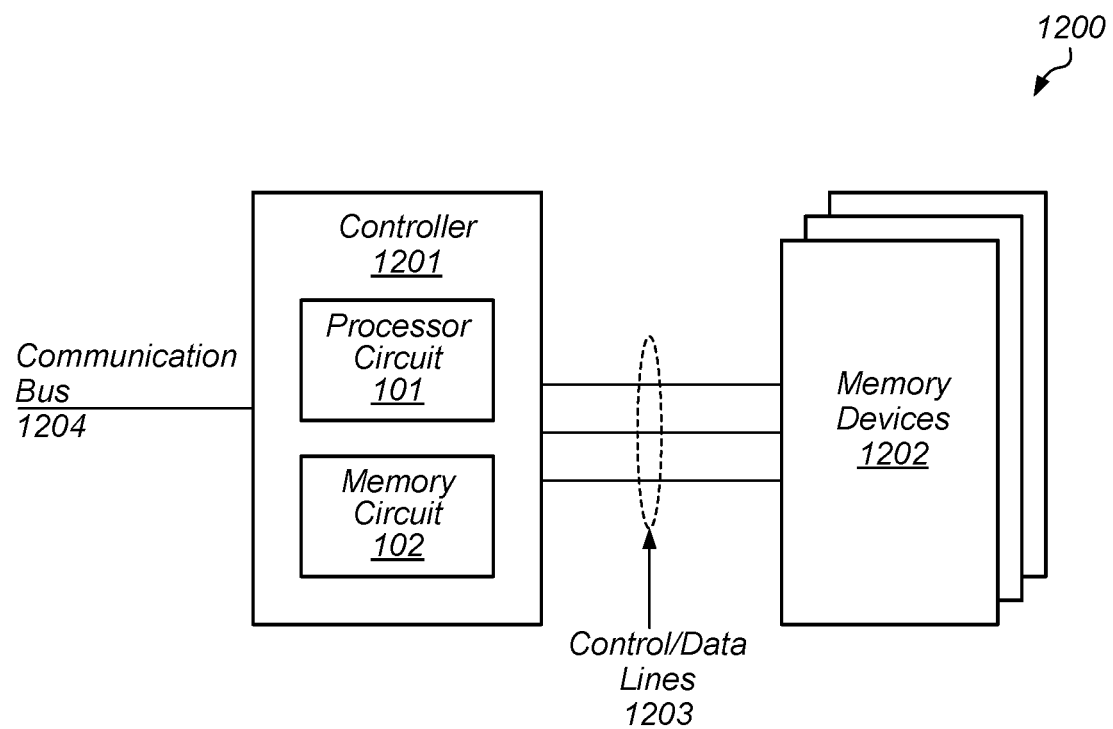
FIG. 12 is a block diagram of one embodiment of a storage subsystem for a computer system.

A block diagram of a storage subsystem is illustrated in FIG. 12. As illustrated, storage subsystem 1200 includes controller 1201 coupled to memory devices 1202 by control/data lines 1203. In some cases, storage subsystem 1200 may be included in a computer system, a universal serial bus (USB) flash drive, or other suitable system that employs data storage.

Controller 1201 includes processor circuit 101 and memory circuit 102. It is noted that controller 1201 may include additional circuits (not shown) for translating voltage levels of communication bus 1204 and control/data lines 1203, as well as parsing data and/or commands received via communication bus 1204 according to a communication protocol used on communication bus 1204. In some embodiments, however, memory circuit 102 may be included within memory devices 1202 rather than controller 1201.

In response to receiving a request for access to memory devices 1202 via communication bus 1204, processor circuit 101 may fetch and execute program instructions from memory circuit 102 as described above. As the fetched program instructions are executed by processor circuit 101, commands, addresses, and the like may be generated by processor circuit 101 and sent to memory devices 1202 via control/data lines 1203. Additionally, processor circuit 101, in response to executing different fetched program instructions, may receive previously stored data from memory devices 1202, and re-format the data to be sent to another functional circuit via communication bus 1204. In cases were memory devices 1202 include non-volatile memory cells, processor circuit 101 may, in response to fetching and executing particular subroutines or macros stored in memory circuit 102, manage the non-volatile memory cells by performing garbage collections, and the like.

Memory devices 1202 may, in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. In some cases, memory devices 1202 may be arranged for use as a solid-state hard disc drive.

Figure 13:
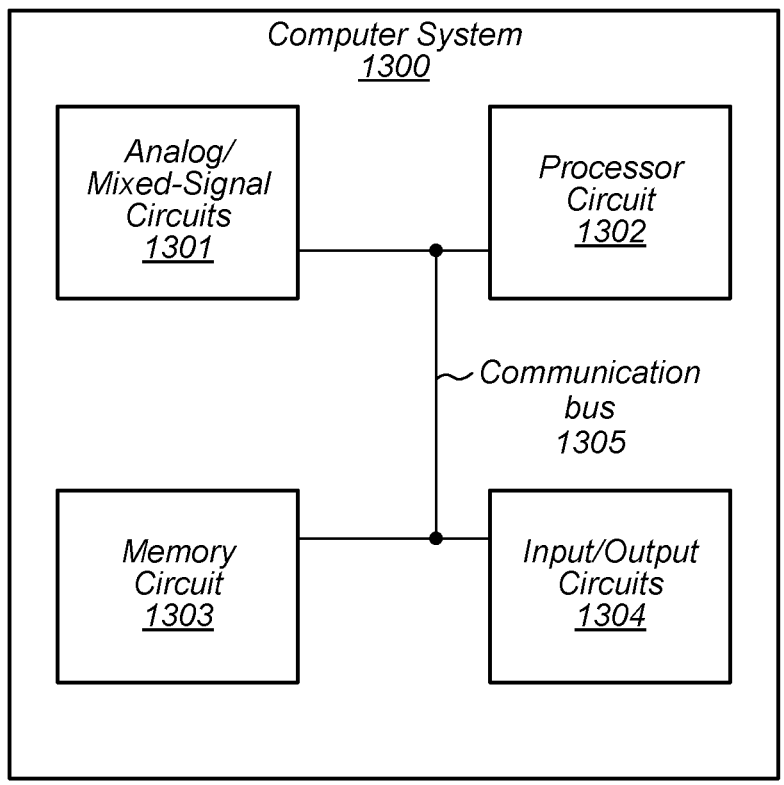
FIG. 13 is a block diagram of another embodiment of a computer system.

A block diagram of a computer system is illustrated in FIG. 13. In the illustrated embodiment, the computer system 1300 includes analog/mixed-signal circuits 1301, processor circuit 1302, memory circuit 1303, and input/output circuits 1304, each of which is coupled to communication bus 1305. In various embodiments, computer system 1300 may be a system-on-a-chip (SoC) and/or be configured for use in a desktop computer, server, or in a mobile computing application such as, e.g., a tablet, or laptop computer.

Analog/mixed-signal circuits 1301 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal circuits 1301 may be configured to perform power management tasks with the inclusion of on-chip power supplies and voltage regulators. Analog/mixed-signal circuits 1301 may also include, in some embodiments, radio frequency (RF) circuits that may be configured for operation with wireless networks.

Processor circuit 1302 may, in various embodiments, be representative of a general-purpose processor that performs computational operations. For example, processor circuit 1302 may be a central processing unit (CPU) such as a microprocessor, a microcontroller, an application-specific integrated circuit (ASIC), or a field-programmable gate array (FPGA). In various embodiments, processor circuit 1302 may correspond to processor circuit 101 as depicted in FIG. 1, and may be configured to send fetch command 107 via communication bus 1305. Processor circuit 1302 may be further configured to receive instruction data 108 via communication bus 1305.

Memory circuit 1303 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although in a single memory circuit is illustrated in FIG. 13, in other embodiments, any suitable number of memory circuits may be employed. It is noted that in some embodiments, memory circuit 1303 may correspond to memory circuit 102 as depicted in FIG. 1.

Input/output circuits 1304 may be configured to coordinate data transfer between computer system 1300 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1304 may be configured to implement a version of Universal Serial Bus (USB) protocol or IEEE 1394 (Firewire®) protocol.

Input/output circuits 1304 may also be configured to coordinate data transfer between computer system 1300 and one or more devices (e.g., other computing systems or integrated circuits) coupled to computer system 1300 via a network. In one embodiment, input/output circuits 1304 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1304 may be configured to implement multiple discrete network interface ports.

Figure 14:
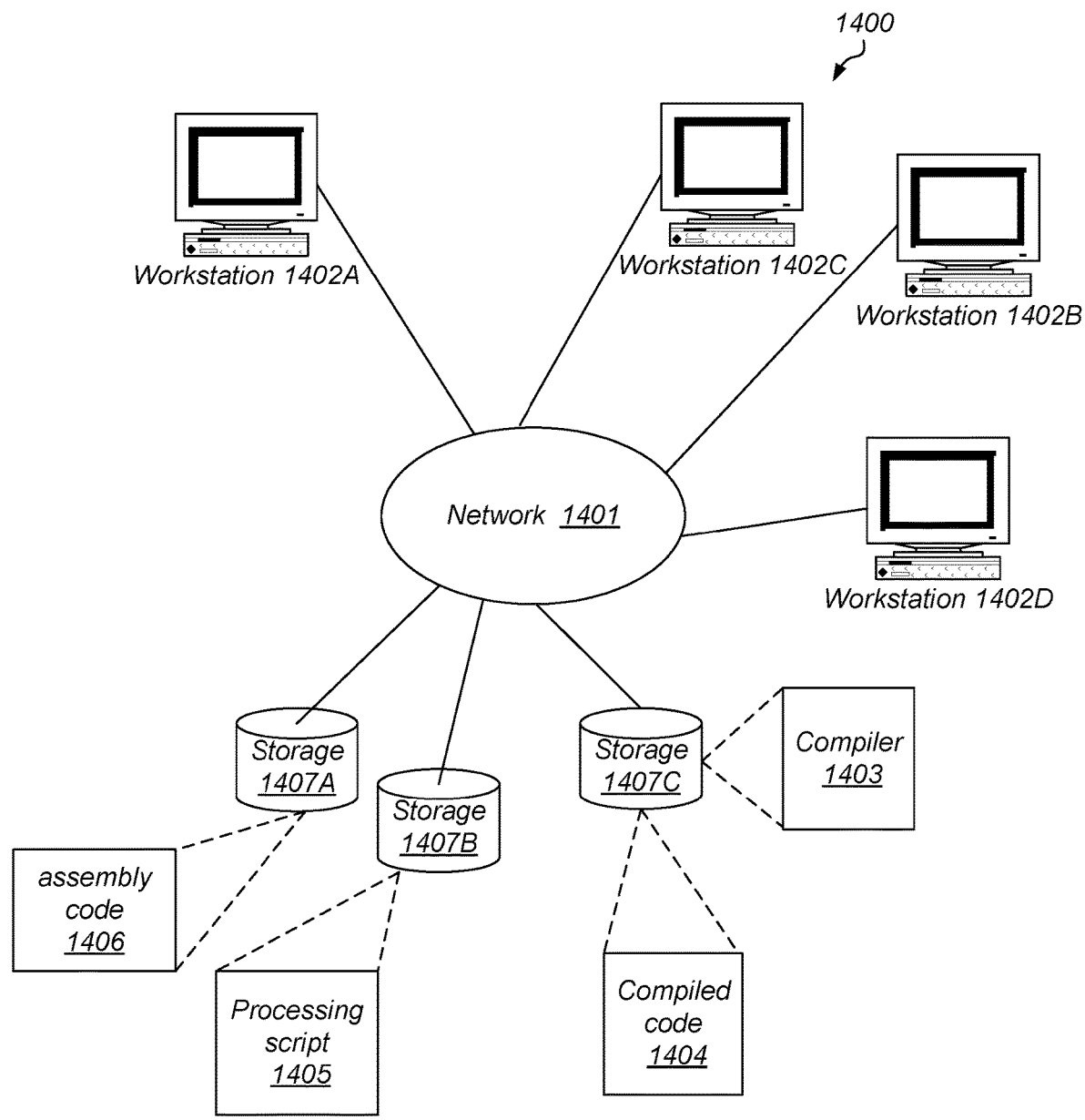
FIG. 14 is a block diagram depicting a computer system coupled together using a network.

Turning to FIG. 14, a block diagram depicting an embodiment of a computer network is illustrated. The computer system 1400 includes a plurality of workstations designated 1402A through 1402D. The workstations are coupled together through a network 1401 and to a plurality of storage devices designated 1407A through 1407C. In one embodiment, each of workstations 1402A-1402D may be representative of any standalone computing platform that may include, for example, one or more processors, local system memory including any type of random-access memory (RAM) device, monitor, input output (I/O) means such as a network connection, mouse, keyboard, monitor, and the like (many of which are not shown for simplicity).

In one embodiment, storage devices 1407A-1407C may be representative of any type of mass storage device such as hard disk systems, optical media drives, tape drives, ram disk storage, and the like. As such, program instructions for different applications may be stored within any of storage devices 1407A-1407C and loaded into the local system memory of any of the workstations during execution. As an example, assembly code 1406 is shown stored within storage device 1407A, while processing script 1405 is stored within storage device 1407B. Further, compiled code 1404 and compiler 1403 are stored within storage device 1407C. Storage devices 1407A-1407C may, in various embodiments, be particular examples of computer-readable, non-transitory media capable of storing instructions that, when executed by a processor, cause the processor to implement all or part of various methods and techniques described herein. Some non-limiting examples of computer-readable media may include tape reels, hard drives, CDs, DVDs, flash memory, print-outs, etc., although any tangible computer-readable medium may be employed to store processing script 1406.

In one embodiment, processing script 1405 may generate a compressed version of assembly code 1406 using operations similar to those described in FIG. 6 and FIG. 7. In various embodiments, processing script 1405 may replace duplicate instances of repeated sets of program code by unconditional flow control program instructions to reduce the size of assembly code 1406. Compiler 1403 may then compile the compressed version of assembly code 1406 to generate compiled code 1404. Following compilation, compiled code 1404 may be stored in a memory circuit, e.g., memory circuit 102, that is included in any of workstations 1402A-1402D.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein.

Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
a memory circuit including:
    a memory array configured to store a plurality of program instructions that are included in compacted program code;
    a selection circuit connected to the memory array;
    a decoder circuit configured to decode the program instructions received from the memory array;
    a logic circuit configured to assert a halt signal that is sent to a processor circuit; and
    a buffer circuit configured to buffer the program instructions to send to the processor circuit; and
wherein the processor circuit is configured to:
    generate a fetch address using a program counter of the processor circuit; and
    provide the fetch address to the memory circuit;
wherein the memory circuit is external to the processor circuit and is configured to:
    receive the fetch address from the processor circuit at the selection circuit;
    based on the fetch address corresponding to a first program instruction of the compacted program code, retrieve the first program instruction from a storage location within the memory array;
    decode the first program instruction using the decoder circuit;
    send the first program instruction from the decoder circuit to the logic circuit and to the buffer circuit for sending the first program instruction to the processor circuit;
    determine a type of the first program instruction using the logic circuit;
    in response to a determination that the type of the first program instruction is an instruction for fetching, without storing a return address, a particular instruction sequence having a number of program instructions defined by the first program instruction:
        assert the halt signal, using the logic circuit, to cause the program counter to stop incrementing such that the fetch address generated by the processor circuit does not change while the halt signal is asserted;
        provide, from the logic circuit to the selection circuit, a selection signal and a retrieval address included in the first program instruction that corresponds to a particular program instruction of the particular instruction sequence;
        select, using the selection circuit, between the fetch address and the retrieval address based on the selection signal;
        retrieve, from the memory array, the particular instruction sequence beginning at the retrieval address included in the first program instruction;
        send the particular instruction sequence to the processor circuit via the buffer circuit; and
        de-assert the halt signal, using the logic circuit, in response to the particular instruction sequence having been retrieved from the memory array.

2. The system of claim 1, wherein the processor circuit and the memory circuit operate cooperatively to fetch, decode, and execute the first program instruction.

3. The system of claim 1, wherein to send the first program instruction and the particular instruction sequence to the processor circuit, the memory circuit is further configured to send a first instruction of the particular instruction sequence using a rising edge of a clock signal, and send a second instruction of the particular instruction sequence using a falling edge of the clock signal that is subsequent to the rising edge of the clock signal.

4. An apparatus, comprising:
a memory array configured to store a compressed version of program code that includes a plurality of program instructions; and
a control circuit that includes:
    a logic circuit;
    a selection circuit;
    a buffer circuit; and
    a decoder circuit configured to:
        receive a first program instruction of the plurality of program instructions from the memory array;
        decode the first program instruction; and
        send the first program instruction to the logic circuit and to the buffer circuit for sending the first program instruction to a processor;
wherein the logic circuit is configured to:
    determine a type of the first program instruction; and
    in response to a determination that the type of the first program instruction is an instruction for fetching, without storing a return address, a particular instruction sequence having a specified number of program instructions:
        assert a halt signal to cause a program counter of the processor to stop incrementing while the particular instruction sequence is fetched;
        generate a selection signal and a retrieval address that corresponds to a particular program instruction of the particular instruction sequence; and
        provide, to the selection circuit, the selection signal and the retrieval address; and
wherein the selection circuit is configured to:
    receive a fetch address from the program counter of the processor;
    make a selection between the fetch address and the retrieval address based on the selection signal; and
    provide the selection to the memory array.

5. The apparatus of claim 4, wherein the control circuit is configured to retrieve the particular instruction sequence from the memory array using an address included in the first program instruction.

6. The apparatus of claim 4, wherein the buffer circuit is configured to store the particular instruction sequence prior to sending the particular instruction sequence to the processor.

7. The apparatus of claim 4, wherein the memory array includes a plurality of banks, and wherein to retrieve the particular instruction sequence from the memory array, the control circuit is further configured to activate, in parallel, at least two banks of the plurality of banks.

8. The apparatus of claim 4, wherein the selection circuit is external to the decoder circuit and the logic circuit, and wherein the logic circuit is external to the decoder circuit.

9. The apparatus of claim 4, wherein the memory array is configured to:
  store a first instruction and a second instruction of the particular instruction sequence across a plurality of memory banks of the memory array, wherein the second instruction is sequentially next to the first instruction in the particular instruction sequence; and
  access the first instruction and the second instruction in parallel from the plurality of memory banks.

10. The apparatus of claim 4, wherein the memory array is configured to:
  store the particular instruction sequence within one of a plurality of memory banks of the memory array.

11. A method, comprising:
  receiving, by a selection circuit of a memory circuit, a fetch address generated by a processor circuit using a program counter;
  in response to receiving the fetch address, the memory circuit retrieving, from a memory array of the memory circuit that is connected to the selection circuit, a first program instruction of a plurality of program instructions based on the fetch address, wherein the first program instruction is included in compacted program code;
  decoding, by a decoder circuit of the memory circuit, the first program instruction, wherein the decoder circuit receives the first program instruction from the memory array and sends the first program instruction to a logic circuit of the memory circuit and to a buffer circuit of the memory circuit for sending the first program instruction to the processor circuit;
  determining, by the logic circuit, a type of the first program instruction;
  in response to a determination that the type of the first program instruction is an instruction for fetching, without storing a return address, a particular instruction sequence having a number of program instructions specified by the first program instruction, the logic circuit of the memory circuit:
    asserting a halt signal to cause the program counter to stop incrementing while the particular instruction sequence is fetched;
    generating a set of addresses for retrieving the particular instruction sequence; and
    providing the set of addresses and a selection signal to the selection circuit of the memory circuit, the selection circuit selecting between the fetch address and the set of addresses to retrieve, from the memory array based on the selection signal, the particular instruction sequence beginning at an address included in the first program instruction;
  sending, by the memory circuit, the particular instruction sequence to the processor circuit via the buffer circuit; and
  de-asserting, by the logic circuit, the halt signal in response to the particular instruction sequence having been retrieved from the memory array.

12. The method of claim 11, wherein the compacted program code includes:
  a first subroutine that includes the particular instruction sequence; and
  a second, separate subroutine that includes the first program instruction, wherein the first subroutine and the second subroutine are ordered within the compacted program code such that the first subroutine and the second subroutine are located next to each other in an address space of the compacted program code.

* * * * *